US008624885B2

(12) United States Patent
Koide et al.

(10) Patent No.: US 8,624,885 B2
(45) Date of Patent: Jan. 7, 2014

(54) ELECTRO-OPTICAL DEVICE AND ELECTRONIC APPARATUS

(75) Inventors: Shin Koide, Chino (JP); Shin Fujita, Suwa (JP); Hiroko Muramatsu, Yokohama (JP)

(73) Assignee: Japan Display West Inc., Chita-Gun, Aichi-Ken (JP)

( * ) Notice: Subject to any disclaimer, the term of this patent is extended or adjusted under 35 U.S.C. 154(b) by 1285 days.

(21) Appl. No.: 11/812,502

(22) Filed: Jun. 19, 2007

(65) Prior Publication Data

US 2008/0001912 A1 Jan. 3, 2008

(30) Foreign Application Priority Data

Jul. 3, 2006 (JP) ................................ 2006-183052
Mar. 13, 2007 (JP) ................................ 2007-062950

(51) Int. Cl.
*G06F 3/038* (2013.01)
*G09G 5/00* (2006.01)

(52) U.S. Cl.
USPC .......................................... 345/207; 345/102

(58) Field of Classification Search
USPC ................................................ 345/102, 207
See application file for complete search history.

(56) References Cited

U.S. PATENT DOCUMENTS

| | | | | |
|---|---|---|---|---|
| 5,278,685 | A * | 1/1994 | Iwamoto et al. | 349/187 |
| 6,496,240 | B1 * | 12/2002 | Zhang et al. | 349/116 |
| 7,050,131 | B2 * | 5/2006 | Choi et al. | 349/110 |
| 7,218,048 | B2 * | 5/2007 | Choi et al. | 313/504 |
| 2006/0077167 | A1 * | 4/2006 | Kim et al. | 345/98 |
| 2006/0125769 | A1 * | 6/2006 | Ding | 345/102 |
| 2006/0238894 | A1 * | 10/2006 | Sano | 359/714 |
| 2007/0030255 | A1 * | 2/2007 | Pak et al. | 345/173 |
| 2007/0070002 | A1 | 3/2007 | Fujita et al. | |
| 2007/0070025 | A1 | 3/2007 | Fujita et al. | |
| 2007/0070264 | A1 | 3/2007 | Fujita et al. | |

FOREIGN PATENT DOCUMENTS

| | | | |
|---|---|---|---|
| JP | A 6-186580 | | 7/1994 |
| JP | 09015613 | * | 1/1997 |
| JP | A 11-84424 | | 3/1999 |
| JP | A 11-95263 | | 4/1999 |
| JP | A 2005-121997 | | 5/2005 |
| JP | A-2006-118965 | | 5/2006 |
| JP | A-2007-094098 | | 4/2007 |

* cited by examiner

*Primary Examiner* — Seokyun Moon
(74) *Attorney, Agent, or Firm* — K&L Gates LLP

(57) ABSTRACT

An electro-optical device includes an electro-optical panel, a display area of the electro-optical panel being surrounded by a peripheral member. The electro-optical device also includes the following elements. A light-receiving sensor receives external light. A light-shielded sensor is connected to the light-receiving sensor and is shielded from the external light received by the light-receiving sensor. The light-shielded sensor is located at a position at which it is overlapped with the peripheral member.

11 Claims, 8 Drawing Sheets

ELECTRO-OPTICAL DEVICE AND ELECTRONIC APPARATUS

BACKGROUND

1. Technical Field

The present invention relates to electro-optical devices and electronic apparatuses.

2. Related Art

As a typical electro-optical device, a liquid crystal device is known. The liquid crystal device includes, for example, a liquid crystal panel and a backlight disposed opposite the liquid crystal panel to emit light.

The liquid crystal panel includes a pair of substrates and a liquid crystal disposed therebetween. The liquid crystal panel is provided with a pair of electrodes. The pair of electrodes applies a drive voltage to the liquid crystal to change the alignment and order of liquid crystal molecules. Then, light emitted from a backlight and passing through the liquid crystal is changed so that images can be displayed with grayscale levels.

The visibility of display of the liquid crystal device changes depending on the brightness around the liquid crystal device due to external light, such as sunlight. That is, as the brightness around the liquid crystal device increases, the difference between the brightness around the liquid crystal device and the brightness of the display area of the liquid crystal device decreases. Accordingly, the visibility of the display of the liquid crystal device deteriorates.

To overcome this drawback, a liquid crystal device including an optical sensor for detecting the illuminance of external light has been proposed (see, for example, JP-A-2005-121997).

In this liquid crystal device, the illuminance of external light is detected by the optical sensor, and the amount of light emitted from a backlight is controlled in accordance with the detected illuminance of the external light. Thus, the amount of light emitted from the backlight and supplied to a liquid crystal panel can be adjusted in accordance with the brightness around the liquid crystal device. As a result, the visibility of the display of the liquid crystal device can be improved.

The above-described optical sensor includes a first PIN diode for receiving external light and a second PIN diode which is shielded from external light. The first PIN diode outputs an electric signal in accordance with, not only the illuminance of external light, but also the temperature of the PIN diode. On the other hand, the second PIN diode, which is shielded from external light, outputs an electric signal in accordance with factors, such as the temperature of the PIN diode, other than the illuminance of external light.

The optical sensor determines the difference between the electric signal output from the first PIN diode and the electric signal output from the second PIN diode. Accordingly, the optical sensor eliminates factors, such as the temperature of the PIN diode, other than the illuminance of external light, from the electric signal output from the first PIN diode, and then outputs the electric signal reflecting only the illuminance of the external light. By determining the amount of received external light on the basis of the level of the electric signal, the illuminance of the external light can be detected with high precision.

As described above, in order to detect the illuminance of the external light with high precision, it is necessary that the second PIN diode output an electric signal with high precision in accordance with factors, such as the temperature of the PIN diode, other than the illuminance of the external light. Accordingly, the degree to which the second PIN diode is shielded from light should be increased to eliminate the influence of the illuminance of external light from the electric signal output from the second PIN diode. Thus, between a pair of substrates of the liquid crystal panel, a light-shielding film for shielding the second PIN diode from external light is formed on the substrate on which the external light is incident. This light-shielding film can stop the external light incident on the liquid crystal panel from directly reaching the second PIN diode.

The external light incident on the liquid crystal panel is sometimes diffused between the pair of substrates of the liquid crystal panel. The above-described light-shielding film, however, cannot stop the diffused external light from reaching the second PIN diode, which serves as a light-shielded sensor. This decreases the degree to which the second PIN diode is shielded from light. Accordingly, the precision of the illuminance of the external light to be detected is decreased.

SUMMARY

An advantage of some aspects of the invention is that it provides an electro-optical device and an electronic apparatus that can detect the illuminance of external light with high precision.

According to an aspect of the invention, there is provided an electro-optical device including an electro-optical panel, a display area of the electro-optical panel being surrounded by a peripheral member. The electro-optical device also includes a light-receiving sensor that receives external light and a light-shielded sensor that is connected to the light-receiving sensor and that is shielded from the external light received by the light-receiving sensor. The light-shielded sensor is located at a position at which it is overlapped with the peripheral member. The light-receiving sensor and the light-shielded sensor form an optical sensor to detect the illuminance of external light.

According to the above-described electro-optical device, the light-shielded sensor is located such that it is overlapped with the peripheral member that surrounds the display area of the electro-optical panel. The peripheral member, which reflects or absorbs external light, can stop the external light from reaching the light-shielded sensor. Thus, the influence of the illuminance of external light on the electric signal output from the light-shielded sensor becomes smaller so that the illuminance of external light can be detected with high precision. Preferably, the light-shielded sensor is located such that it is wholly covered with the peripheral member. However, the light-shielded sensor may be located such that it is partially covered with the peripheral member. In either of the case, advantages achieved by an embodiment of the invention can be obtained.

It is preferable that the above-described electro-optical device includes an illumination unit that emits light to the electro-optical panel and that a first light-shielding film is disposed between the illumination unit and the light-receiving sensor and between the illumination unit and the light-shielded sensor. The illumination unit is located opposite the electro-optical panel. The first light-shielding film is disposed on the electro-optical panel in an area opposing the illumination unit and corresponding to the area in which the light-receiving sensor and the light-shielded sensor are disposed.

According to the above-described electro-optical device, light emitted from the illumination unit can be stopped from reaching the light-receiving sensor and the light-shielded sensor. Thus, the influence of the illuminance of light emitted from the illumination unit on the electric signal output from the light-receiving sensor and the electric signal output from the light-shielded sensor becomes smaller so that the illuminance of external light can be detected with high precision.

It is preferable that the electro-optical panel is a liquid crystal panel including a pair of substrates between which a liquid crystal is disposed and the peripheral member is a sealing member that seals the liquid crystal. It is also preferable that a material having a low transmittance ratio is contained in the peripheral member. More specifically, it is preferable that the sealing member includes an adhesive material that bonds the pair of substrates to each other and a material having a transmittance ratio lower than the adhesive material. For example, particles having a high light absorption ratio or a pigment having a high light absorption ratio may be mixed into the adhesive material, which is the main component of the sealing member. With this arrangement, the absorption ratio of the material itself can be increased.

According to the above-described electro-optical device, a material having a low transmittance ratio is mixed into the peripheral member. Thus, the amount of external light passing through the peripheral member is decreased so that external light can further be blocked from reaching the light-shielded sensor. Thus, the influence of the illuminance of external light on the electric signal output from the light-shielded sensor becomes smaller. As a result, highly precise detection of the illuminance of external light can be achieved.

In the above-described electro-optical device, it is preferable that a light detection circuit is connected to the light-receiving sensor and the light-shielded sensor so that the light detection circuit outputs a light detection signal on the basis of an electric signal output from the light-receiving sensor and an electric signal output from the light-shielded sensor. More specifically, the light-receiving sensor and the light-shielded sensor are connected in series with each other, and the light detection circuit is connected to the node between the light-receiving sensor and the light-shielded sensor. The light detection circuit outputs a light detection signal if the difference between the electric signal output from the light-receiving sensor and the electric signal output from the light-shielded sensor exceeds a predetermined threshold.

According to the above-described electro-optical device, the light-receiving sensor and the light-shielded sensor are connected in series with each other, and the light detection circuit is connected to the node between the two sensors. At this node, the voltage corresponding to the difference between the electric signal output from the light-receiving sensor and the electric signal output from the light-shielded sensor is generated. Based on this voltage, the time until the light detection circuit outputs a light detection signal is counted. As a result, the illuminance of external light can be detected. Additionally, the peripheral member is formed to be larger than the light detection circuit. With this arrangement, the light detection circuit, as well as the light-shielded sensor, can be located such that it is overlapped with the peripheral member. As a result, erroneous operations of the light detection circuit can be prevented and highly precisely light detection can be implemented.

In the above-described electro-optical device, it is preferable that the light detection circuit includes a first detection circuit that outputs a first detection signal if the electric signal output from the light-receiving sensor exceeds a predetermined threshold and a second detection circuit that outputs a second detection signal if the electric signal output from the light-shielded sensor exceeds a predetermined threshold. It is also preferable that the light detection signal is output if one of the first detection signal and the second detection signal is output.

According to the above-described electro-optical device, the first detection circuit is connected to the light-receiving sensor, and the second detection circuit is connected to the light-shielded sensor. Accordingly, the first detection circuit outputs the first detection signal on the basis of the electric signal output from the light-receiving sensor. The second detection circuit outputs the second detection signal on the basis of the electric signal output from the light-shielded sensor. Then, if one of the first detection signal and the second detection signal is output, the light detection circuit outputs the light detection signal. The light detection circuit counts the time for which the light detection signal is output. As a result, the illuminance of external light can be detected.

According to the above-described electro-optical device, it is preferable that a second light-shielding film that shields the light-shielded sensor from the external light is disposed and that the light-receiving sensor is located at a position at which the light-receiving sensor is exposed through the second light-shielding film. With this configuration, the light-receiving sensor is exposed through the second light-shielding film so that it can receive external light. In contrast, the light-shielded sensor is shielded from external light by the provision of the second light-shielding film. It is preferable that the second light-shielding film is located at a position at which it is overlapped with the peripheral member and is formed to be larger than the peripheral member. That is, since the second light-shielding film is formed such that it covers the peripheral member, the entry of external light coming from right above the peripheral member can be completely blocked, and the high light-shielding effect can be implemented. Additionally, the circuits forming the optical sensor other than the light-shielded sensor, for example, the light detection circuit, may also be located such that it is overlapped with the second light-shielding film. That is, among the circuits forming the optical sensor, only the light-receiving sensor is exposed to external light. With this configuration, erroneous operations of the optical sensor can be prevented so that more highly precise light detection can be implemented. It is also preferable that the second light-shielding film is disposed in a frame-like shape to surround the display area of the display panel. With this arrangement, the second light-shielding film may be used as a frame that defines the display area, i.e., the “display frame”.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
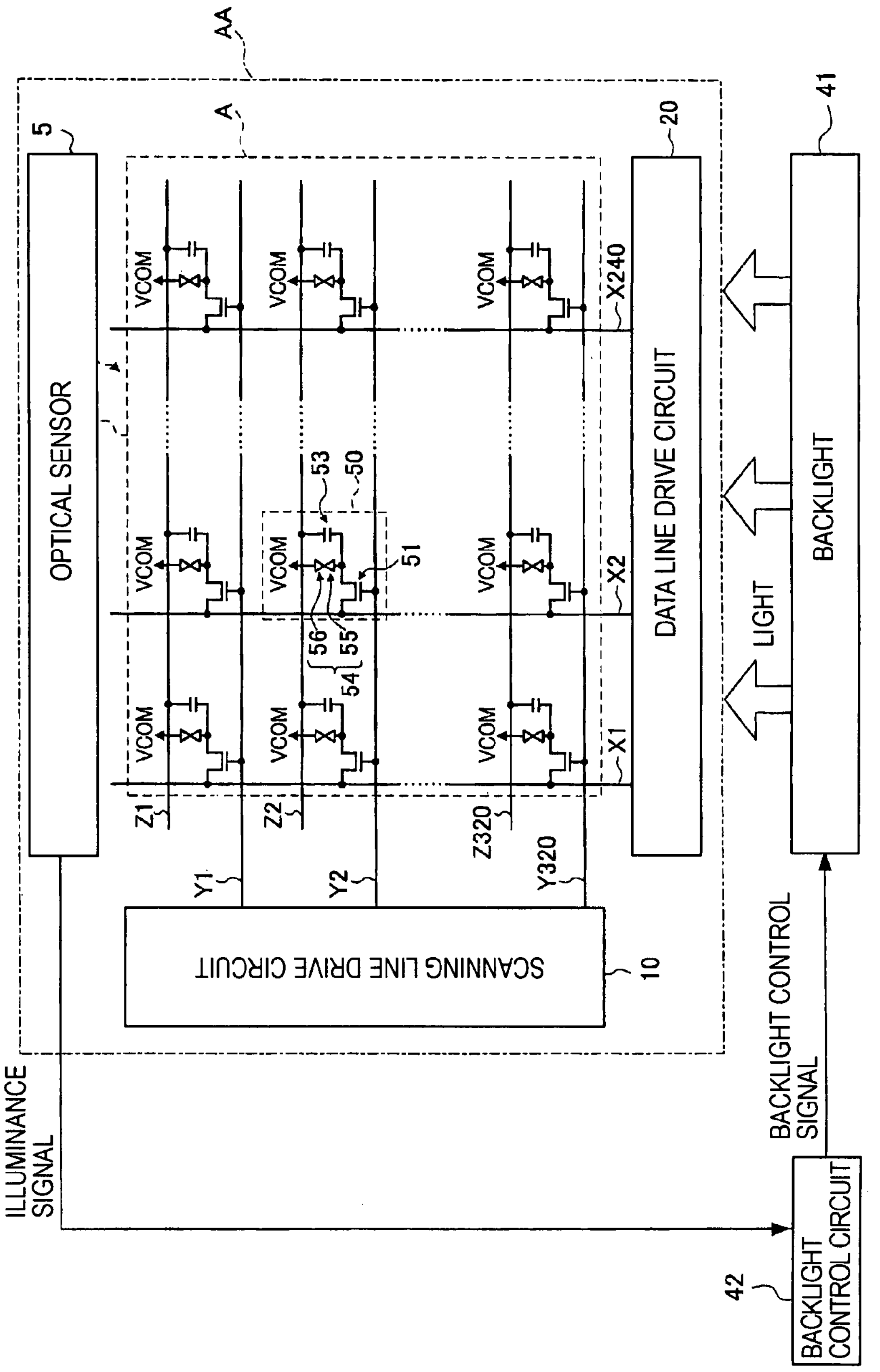
FIG. 1 is a block diagram illustrating an electro-optical device according to a first embodiment of the invention.

Embodiments of the invention are described below with reference to the accompanying drawings. In the following descriptions of the embodiments and modifications, the same components are designated with like reference numerals, and an explanation thereof is thus omitted or simplified.

First Embodiment

FIG. 1 is a block diagram illustrating an electro-optical device 1 according to a first embodiment of the invention.

The electro-optical device 1 includes a liquid crystal panel AA, which serves as an electro-optical panel, a backlight 41, which serves as an illumination unit disposed opposite the liquid crystal panel AA to emit light, and a backlight control circuit 42 that controls the backlight 41. The electro-optical device 1 performs transmissive-mode display by utilizing light emitted from the backlight 41.

The liquid crystal panel AA includes a display area A having a plurality of pixels 50, an optical sensor 5 that detects the illuminance of external light, and a scanning line drive circuit 10 and a data line drive circuit 20 disposed around the display area A to drive the pixels 50.

The optical sensor 5 detects the illuminance of external light and outputs an illuminance signal indicating the illuminance of the external light.

The backlight 41 is disposed on the back surface of the liquid crystal panel AA. The backlight 41 is formed of, for example, a cold cathode fluorescent lamp (CCFL), a light-emitting diode (LED), or an electroluminescence (EL), and supplies light to the pixels 50 of the liquid crystal panel AA.

The backlight control circuit 42 outputs a backlight control signal to the backlight 41 on the basis of the illuminance signal output from the optical sensor 5 to control the amount of light emitted from the backlight 41. More specifically, if the illuminance signal output from the optical sensor 5 exceeds a predetermined threshold, the backlight control circuit 42 determines that the brightness around the electro-optical device 1 is large and thus increases the amount of light emitted from the backlight 41. In contrast, if the illuminance signal output from the optical sensor 5 is less than the predetermined threshold, the backlight control circuit 42 determines that the brightness around the electro-optical device 1 is small and thus decreases the amount of light emitted from the backlight 41.

Details of the configuration of the liquid crystal panel AA are given below. The liquid crystal panel AA includes 320 scanning lines Y1 through Y320 and 320 capacitance lines Z1 through Z320, which are alternately disposed at regular intervals, and 240 data lines X1 through X240 disposed such that they intersect with the scanning lines Y1 through Y320 and the capacitance lines Z1 through Z320. The pixels 50 are disposed at the corresponding intersections between the scanning lines Y and the data lines X.

Each pixel 50 includes a thin-film transistor (TFT) 51, a pixel electrode 55, a common electrode 56 disposed opposite the pixel electrode 55, and a storage capacitor 53. One electrode of the storage capacitor 53 is connected to the corresponding capacitance line Z and the other electrode thereof is connected to the pixel electrode 55. The pixel electrode 55 and the common electrode 56 sandwich a liquid crystal (not shown) therebetween, which serves as a dielectric as an electro-optical material, to form a pixel capacitor 54.

The gate of the TFT 51 is connected to the corresponding scanning line Y, the source thereof is connected to the corresponding data line X, and the drain thereof is connected to the other electrodes of the pixel electrode 55 and the storage capacitor 53. Accordingly, when a selection voltage is applied from the scanning line Y, the TFT 51 is turned ON, and electrically connects the data line X and the other electrodes of the pixel electrode 55 and the storage capacitor 53.

The scanning line drive circuit 10 sequentially supplies selection voltages for turning ON the TFTs 51 to the plurality of scanning lines Y. For example, if the scanning line drive circuit 10 supplies a selection voltage to a certain scanning line Y, all the TFTs 51 connected to the scanning line Y are turned ON so that all the pixels 50 including the TFTs 51 in the ON state are selected.

The data line drive circuit 20 supplies an image signal to the corresponding data line X to write an image voltage associated with the image signal into the pixel electrode 55 via the TFT 51 which in the ON state.

The above-configured electro-optical device 1 is operated as follows.

Selection voltages are sequentially supplied from the scanning line drive circuit 10 to the 320 scanning lines Y1 through Y320. Then, all the TFTs 51 connected to the corresponding scanning lines Y are sequentially turned ON so that the all the pixels 50 connected to the corresponding scanning lines Y are sequentially selected. In synchronization with the selection of the pixels 50, image signals are supplied from the data line drive circuit 20 to the data lines X. Then, the image signals are supplied to all the pixels 50 selected by the scanning line drive circuit 10 via the corresponding data lines X and TFTs 51 which are in the ON state. The image voltages associated with the image signals are then written into the pixel electrodes 55. As a result, a potential difference is generated between the pixel electrode 55 and the common electrode 56 so that a drive voltage is applied to the liquid crystal.

Applying a drive voltage to the liquid crystal changes the alignment and order of the liquid crystal molecules. Then, light emitted from the backlight 41 and passing through the liquid crystal is changed so that images are displayed with grayscale levels. Because of the storage capacitor 53, the drive voltage applied to the liquid crystal can be held for a time longer than a time for which the image voltage is written into the pixel electrode 55 by the three orders of magnitudes.

Figure 2:
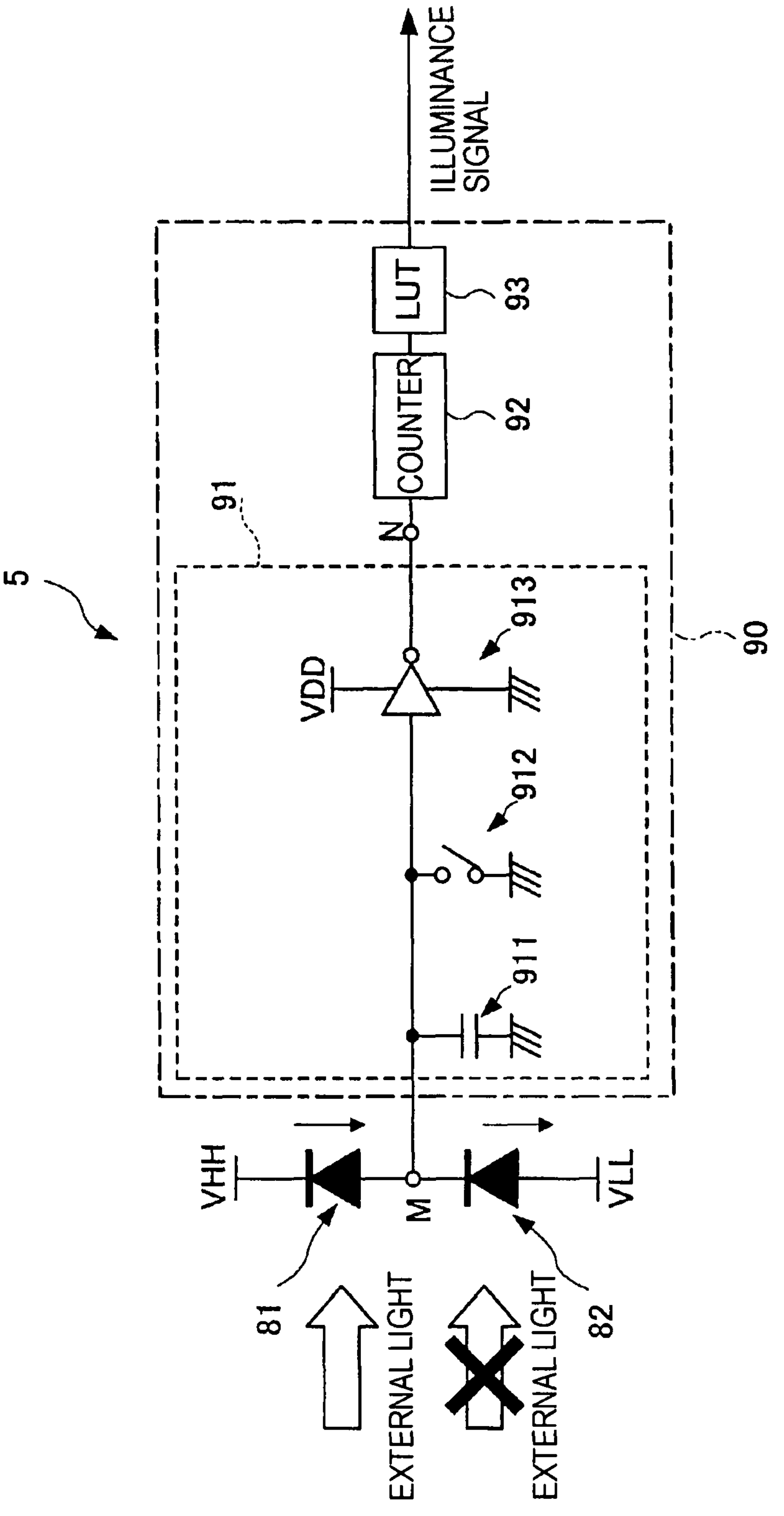
FIG. 2 is a circuit diagram illustrating an optical sensor provided with the electro-optical device.

FIG. 2 is a circuit diagram illustrating the optical sensor 5.

The optical sensor 5 includes a first PIN diode 81, which serves as a light-receiving unit for receiving external light, a second PIN diode 82, which serves as a light-shielded sensor which is shielded external light, and an illuminance detection circuit 90.

The cathode of the first PIN diode 81 is connected to a high potential power supply source VHH, while the anode of the first PIN diode 81 is connected to the cathode of the second PIN diode 82 via a terminal M. The anode of the second PIN diode 82 is connected to a low potential power supply source VLL. That is, the first PIN diode 81 and the second PIN diode 82 are connected in series with each other via the terminal M, and a reverse bias voltage is applied to the first PIN diode 81 and the second PIN diode 82.

The first PIN diode 81 outputs a current from the cathode to the anode in accordance with factors, such as the temperature of the PIN diode in addition to the illuminance of external light. In contrast, the second PIN diode 82, which is shielded from external light, outputs a current from the cathode to the anode in accordance with factors, such as the temperature of the PIN diode, other than the illuminance of external light.

Accordingly, the current reflecting the difference between the current output from the first PIN diode 81 and the current output from the second PIN diode 82 can be extracted from the terminal M. In this current, factors, such as the temperature of the PIN diode, other than the illuminance of the external light, are removed from the current output from the first PIN diode 81. That is, the current difference reflects only the illuminance of the external light.

The illuminance detection circuit 90 includes an optical detector circuit 91, a counter 92, and a look-up table (LUT) 93. The illuminance detection circuit 90 outputs an illuminance signal indicating the illuminance of external light on the basis of a current flowing in the terminal M.

The optical detector circuit 91 includes a capacitor 911, a switching element 912, and an inverter 913. The optical detector circuit 91 outputs a light detection signal on the basis of a current flowing in the terminal M.

The capacitor 911 is charged on the basis of the current flowing in the terminal M. More specifically, one electrode of the capacitor 911 is connected to the terminal M, and the other electrode thereof is connected to a voltage GND of a reference potential power supply source. When the current flowing in the terminal M is supplied to the one electrode of the capacitor 911, electric charge is gradually stored in the capacitor 911 on the basis of the supplied current. Then, the voltage corresponding to the stored electric charge is output from the one electrode of the capacitor 911. Thus, the voltage of the terminal M connected to the one electrode of the capacitor 911 becomes equal to the voltage corresponding, to the electric charge stored in the capacitor 911.

The switching element 912 discharges electric charge stored in the capacitor 911. More specifically, one terminal of the switching element 912 is connected to the one electrode of the capacitor 911, while the other terminal of the switching element 912 is connected to a voltage GND of a reference potential power supply source. When the switching element 912 is turned ON, the electric charge stored in the capacitor 911 migrates to the voltage GND of the reference potential power supply source. Then, the electric charge stored in the capacitor 911 is discharged.

The inverter 913 inverts the voltage of the terminal M and outputs the inverted voltage. More specifically, the input terminal of the inverter 913 is connected to the terminal M, and the output terminal thereof is connected to a terminal N. If the voltage of the terminal M is lower than a predetermined voltage, the inverter 913 outputs the voltage VDD as the light detection signal. If the voltage of the terminal M is higher than the predetermined voltage, the inverter 913 outputs the voltage GND as the light detection signal. Accordingly, the voltage of the terminal N connected to the output terminal of the inverter 913 becomes equal to the voltage output from the inverter 913.

The counter 92 counts the time from when the switching element 912 is turned OFF until when a light detection signal is output from the inverter 913. More specifically, the input terminal of the counter 912 is connected to the terminal N, and the output terminal thereof is connected to the input terminal of the LUT 93. The counter 92 starts counting the time when the switching element 912 is turned OFF, and finishes counting the time when the voltage of the terminal N reaches the voltage GND.

The LUT 93 outputs an illuminance signal indicating the illuminance of external light on the basis of the time counted by the counter 92. More specifically, the input terminal of the LUT 93 is connected to the output terminal of the counter 92. The LUT 93 determines the amount of light on the basis of the time counted by the counter 92.

For example, as the time counted by the counter 92 is longer, it means that the current, which reflects only the illuminance of the external light, flowing in the terminal M is smaller, and thus, it is determined that the amount of external light is smaller. In contrast, as the time counted by the counter 92 is shorter, it means that the current, which reflects only the illuminance of the external light, flowing in the terminal M is larger, and thus, it is determined that the amount of external light is larger.

Then, on the basis of the determined amount of external light, the illuminance of the external light is determined, and the illuminance signal indicating the illuminance of the external light is output from the output terminal of the LUT 93.

Figure 3:
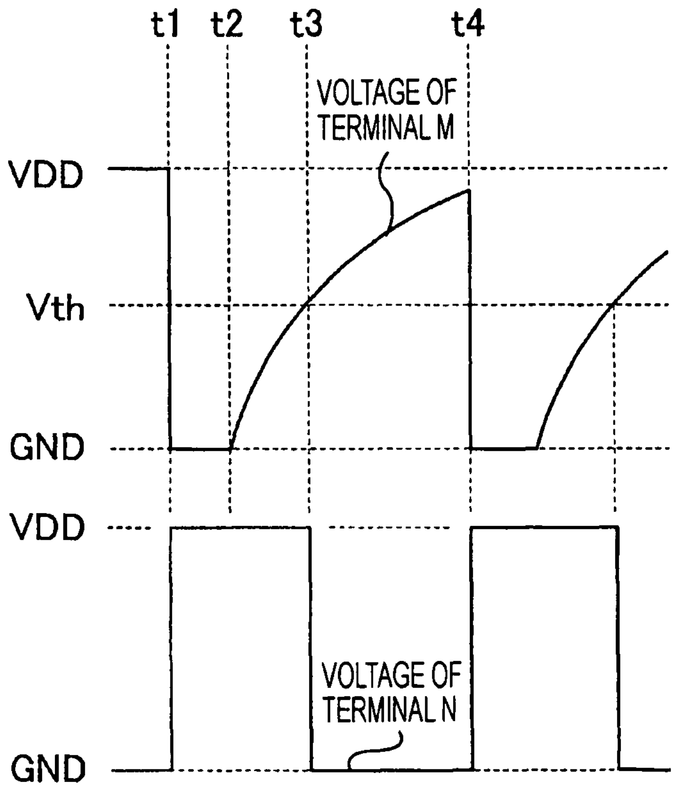
FIG. 3 is a timing chart of the optical sensor provided with the electro-optical device.

FIG. 3 is a timing chart of the optical sensor 5. In FIG. 3, Vth represents the above-described predetermined voltage used in the inverter 913.

At time t1, the switching element 912 is turned ON. Then, the electric charge stored in the capacitor 911 migrates to the voltage GND of the reference potential power supply source and is discharged. Accordingly, the voltage of the terminal M connected to the one electrode of the capacitor 911 becomes equal to the voltage GND, and the voltage of the terminal N connected to the output terminal of the inverter 913, which inverts the voltage of the terminal M and outputs the inverted voltage, becomes equal to the voltage VDD.

Then, at time t2, the switching element 912 is turned OFF. Then, on the basis of the current, which reflects only the illuminance of the external light, flowing in the terminal M, electric charge is gradually stored in the capacitor 911. Accordingly, the voltage of the terminal M gradually increases to the voltage Vth at time t3. At time t2, the counter 92 starts counting the time.

When the voltage of the terminal M reaches the voltage Vth at time 3, the voltage of the terminal N becomes equal to the voltage GND. Simultaneously, the counter 92 finishes counting the time. Then, the LUT 93 determines the amount of external light on the basis of the time from time t1 to time t3 counted by the counter 92, and outputs an illuminance signal.

Then, time t4, as in time t1, the switching element 912 is turned ON. Then, the voltage of the terminal M becomes equal to the voltage GND, and the voltage of the terminal N becomes equal to the voltage VDD.

Figure 4:
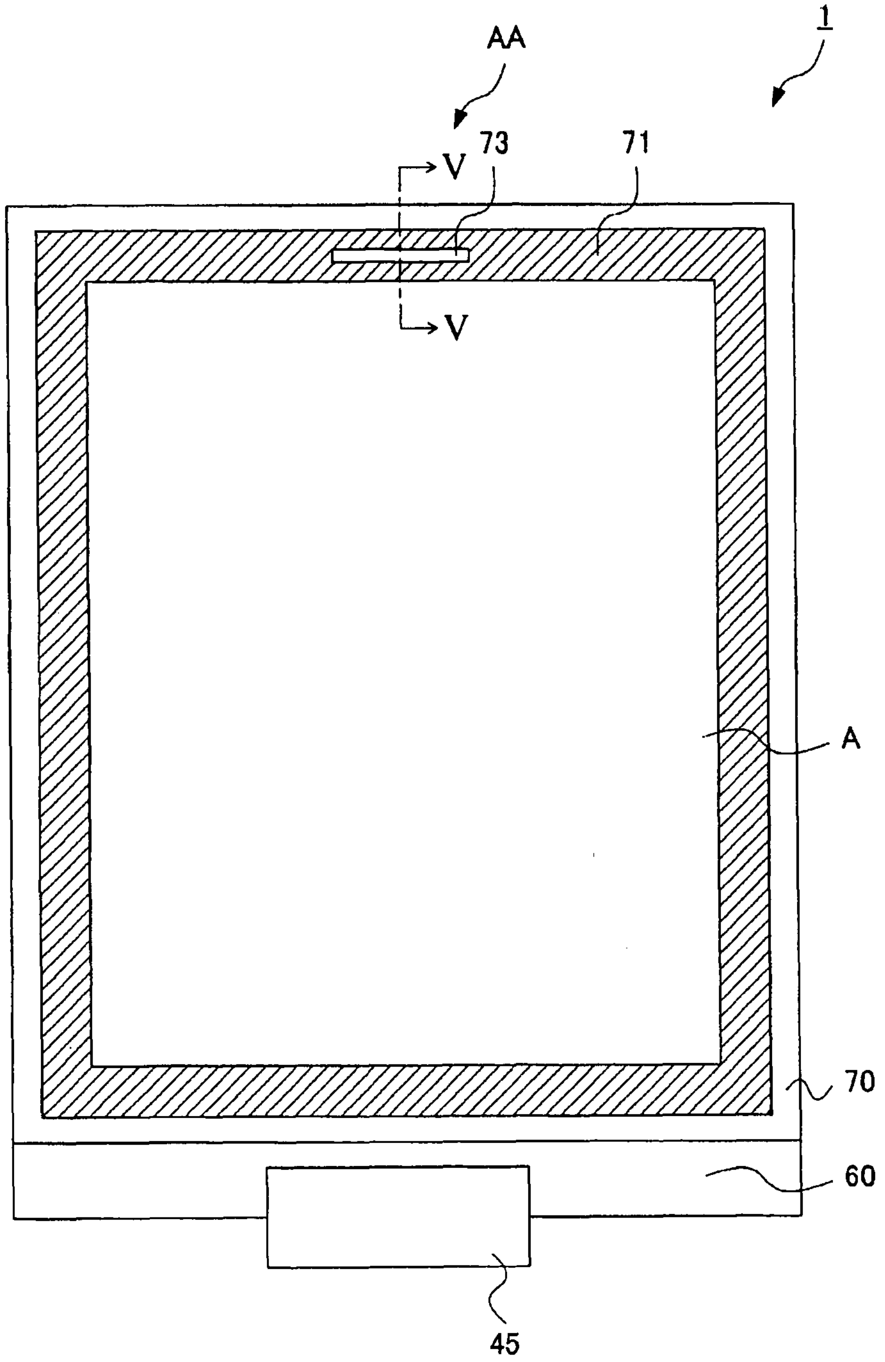
FIG. 4 is a plan view illustrating the electro-optical device.
Figure 5:
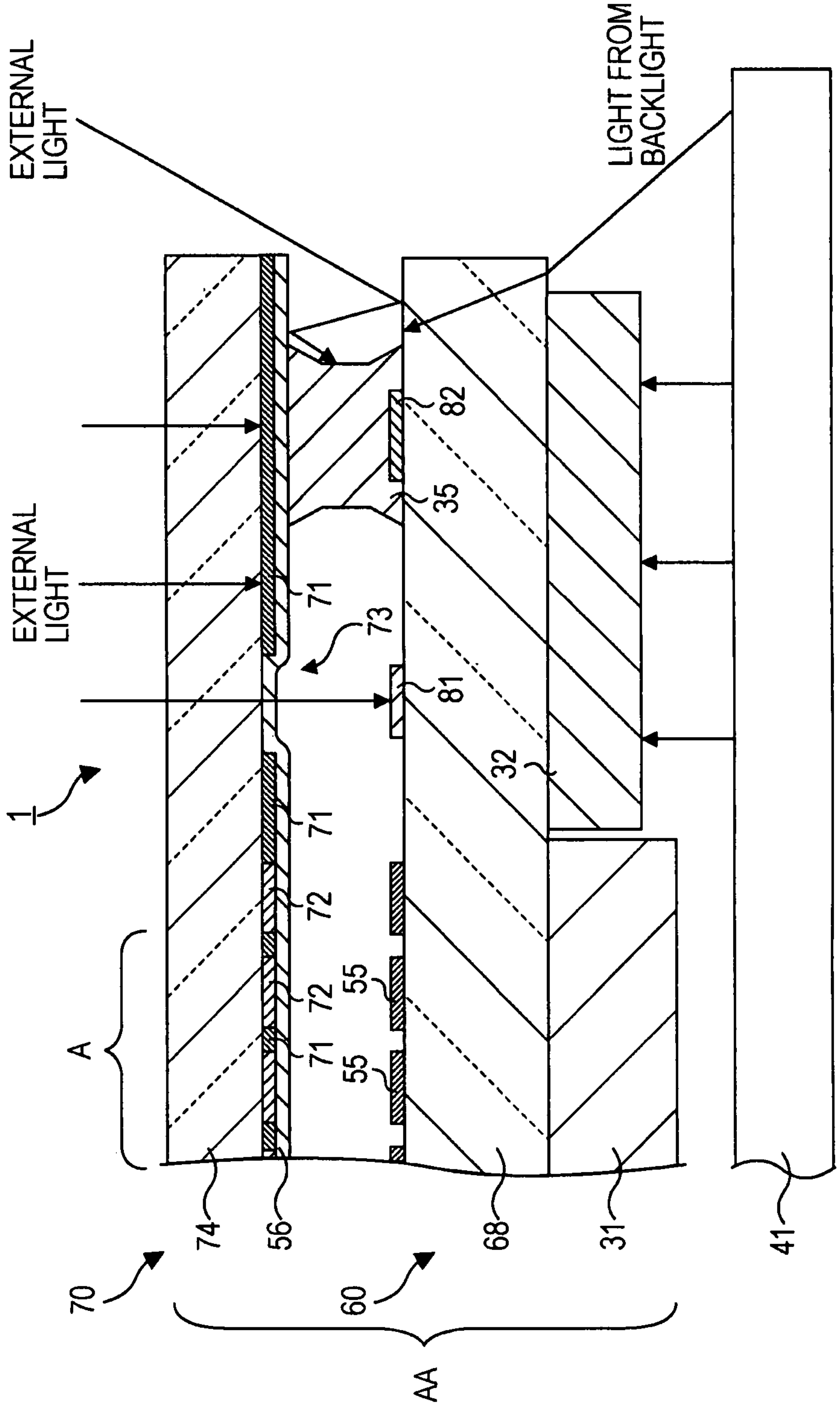
FIG. 5 is a sectional view schematically illustrating the electro-optical device.

FIG. 4 is a plan view illustrating the electro-optical device 1. FIG. 5 is a sectional view schematically illustrating the electro-optical device 1 taken along V-V line of FIG. 4.

The liquid crystal panel AA includes, as shown in FIG. 5, an element substrate 60, a counter substrate 70 disposed opposite the element substrate 60, and a liquid crystal disposed between the element substrate 60 and the counter substrate 70.

The element substrate 60 is formed, as shown in FIG. 4, to be larger than the counter substrate 70, and includes an area that does not oppose the counter substrate 70. A flexible printed circuit (FPC) 45 is connected to the area of the element substrate 60 that does not oppose the counter substrate 70. A driver integrated circuit (IC) (not shown) including the scanning line drive circuit 10 and the data line drive circuit 20 is mounted on the FPC 45.

The element substrate 60 includes a glass substrate 68. On the surface of the glass substrate 68 facing the liquid crystal, in the display area A, the pixel electrodes 55, which are formed of a transparent conductive material, such as indium tin oxide (ITO) or indium zinc oxide (IZO), are disposed at regular intervals. In the display area A on the surface of the glass substrate 68, the TFTs 51 and the storage capacitors 53 (not shown) are also disposed in association with the pixel electrodes 55.

On the surface of the glass substrate 68 facing the liquid crystal, in the area other than the display area A, the first PIN diode 81 and the second PIN diode 82 are disposed.

On the surface of the glass substrate 68 facing the backlight 41, in the display area A, a polarizer 31 is disposed, and in the area other than the display area A, a light-shielding plate 32, which serves as a light-shielding film, is disposed.

The polarizer 31 polarizes light emitted from the backlight 41 and supplies the polarized light to the display area A.

The light-shielding plate 32 is disposed in the area other than the display area A, i.e., in the area in which the first PIN diode 81 and the second PIN diode 82 are disposed. The light-shielding plate 32 blocks light emitted from the backlight 41 and stops light emitted from the backlight 41 from reaching the area other than the display area A.

The counter substrate 70 includes a glass substrate 74. On the surface of the glass substrate 74 facing the liquid crystal, in the display area A facing the pixel electrodes 55, color filters 72 are disposed, and in the display area A other than the area in which the color filters 72 are disposed, a light-shielding film 71, which serves as a black matrix used as a display frame of the display area, is disposed.

On the surface of the glass substrate 74 facing the liquid crystal, in the area, which faces the first PIN diode 81, other than the display area A, a light entrance 73 is formed. In the area other than the area in which the light entrance 73 is formed and other than the display area A, the above-described light-shielding film 71 is disposed.

On the surface of the glass substrate 74 facing the liquid crystal, the common electrode 56, which is formed of a transparent conductive material, such as ITO or IZO, is disposed such that it covers the light-shielding film 71, the color filers 72, and the light entrance 73.

A predetermined gap is formed between the element substrate 60 and the counter substrate 70. In this gap, the liquid crystal is sealed by a sealing member 35, which serves as a peripheral member disposed surrounding the display area A of the liquid crystal panel AA, so that a liquid crystal layer can be formed.

The sealing member 35 is disposed such that it covers the second PIN diode 82 disposed on the glass substrate 68 of the element substrate 60. The sealing member 35 reflects or absorbs light.

In this sealing member 35, opaque beads (not shown) are mixed into an adhesive material, which is the main component of the sealing member 35. The transmittance ratio of the opaque beads is lower than that of the adhesive material. The opaque beads, which are formed of a spherical resin containing a pigment, reflect or absorb light.

According to the first embodiment, the following advantages are obtained.

(1) The second PIN diode 82 is disposed such that it is covered with the sealing member 35 disposed around the display area A of the liquid crystal panel AA. Accordingly, the sealing member 35 can reflect or absorb external light so that the external light can be stopped from reaching the second PIN diode 82. Accordingly, the influence of the illuminance of external light on the current output from the second PIN diode 82 can be decreased. Thus, the illuminance of the external light can be detected with high precision.

(2) In the area of the liquid crystal panel AA opposing the backlight 41, the light-shielding plate 32 is disposed in the area in which the first PIN diode 81 and the second PIN diode 82 are disposed. Accordingly, light emitted from the backlight 41 can be stopped from reaching the first PIN diode 81 and the second PIN diode 82. Thus, the influence of the illuminance of light emitted from the backlight 41 on the current output from the first PIN diode 81 and the current output from the second PIN diode 82 can be decreased. As a result, highly precise detection of the illuminance of external light can be achieved.

(3) The first PIN diode 81 and the second PIN diode 82 are connected in series with each other via the terminal M. The optical detector circuit 91 is connected to the terminal M. From this terminal M, the current reflecting the difference between the current output from the first PIN diode 81 and the current output from the second PIN diode 82 can be extracted. On the basis of the voltage of the capacitor 911 charged by this current, the counter 92 counts the time until the optical detector circuit 91 outputs a light detection signal, and the LUT 93 can determine the illuminance of external light from the counted time.

(4) Opaque beads, which are mixed into the sealing member 35, can reflect or absorb external light and thus decreases the amount of external light passing through the sealing member 35. Accordingly, external light can be further stopped from reaching the second PIN diode 82. Thus, the influence of the illuminance of external light on the current output from the second PIN diode 82 can further be decreased. As a result, highly precise detection of the illuminance of external light can be achieved.

Second Embodiment

Figure 6:
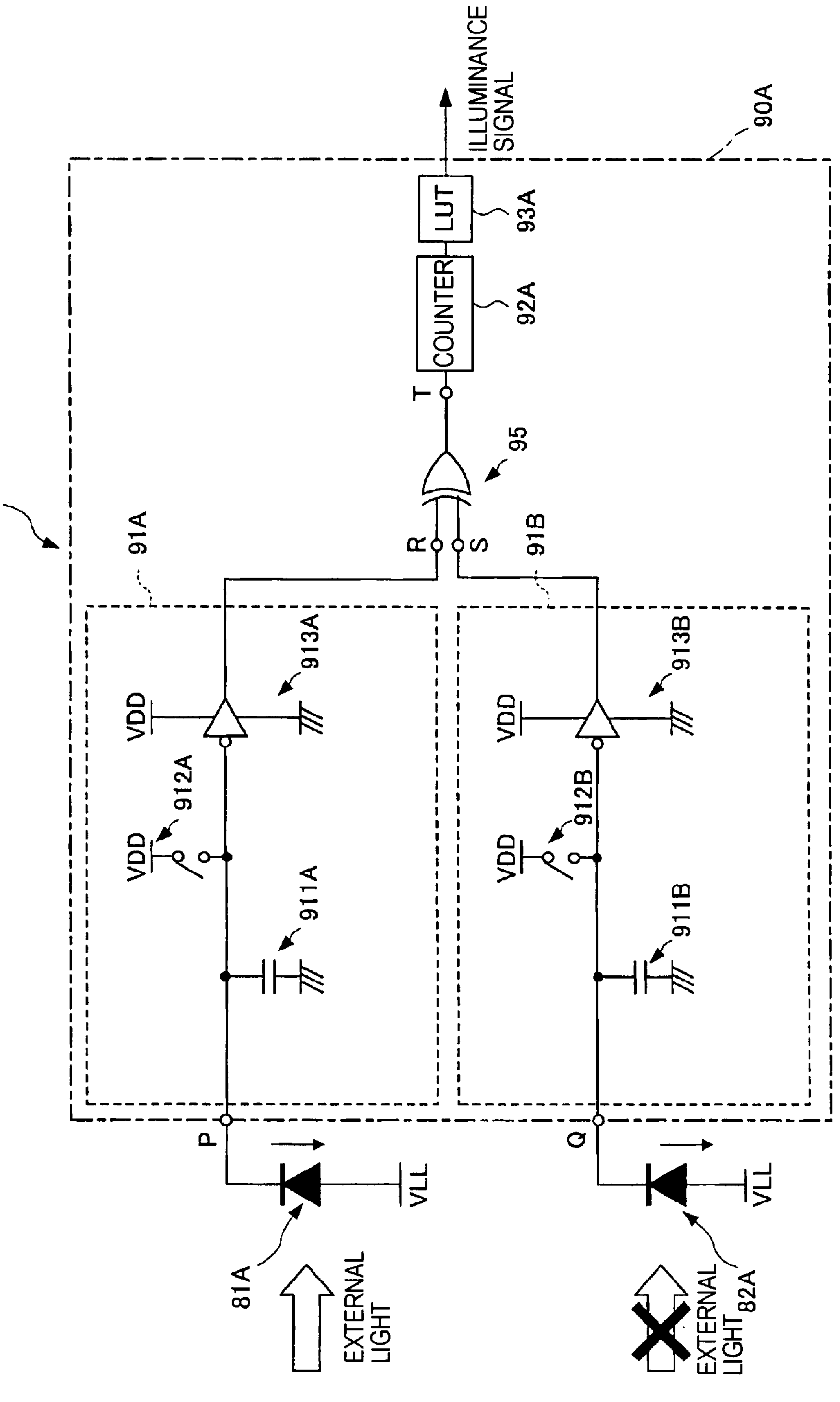
FIG. 6 is a circuit diagram illustrating an optical sensor according to a second embodiment of the invention.

FIG. 6 is a circuit diagram illustrating an optical sensor 5A according to a second embodiment of the invention.

The optical sensor 5A includes a first PIN diode 81A that receives external light, a second PIN diode 82A that is shielded from external light, and an illuminance detection circuit 90A.

The anode of the first PIN diode 81A and the anode of the second PIN diode 82A are connected to low potential power supply sources VLL. The cathode of the first PIN diode 81A and the cathode of the second PIN diode 82A are connected to a terminal P and a terminal Q, respectively.

The current output from the first PIN diode 81A flows in the terminal P, while the current output from the second PIN diode 82A flows in the terminal Q.

The illuminance detection circuit 90A includes a first detection circuit 91A, a second detection circuit 91B, an exclusive logical OR circuit 95, which serves as a photodetector, a counter 92A, and a LUT 93A. The illuminance detection circuit 91A outputs an illuminance signal indicating the illuminance of external light on the basis of the current flowing in the terminal P and the current flowing in the terminal Q.

The first detection circuit 91A includes a capacitor 911A, a switching element 912A, and an inverter 913A. The first detection circuit 91A outputs a first detection signal on the basis of the current flowing in the terminal P.

The second detection circuit 91B includes a capacitor 911B, a switching element 912B, and an inverter 913B. The second detection circuit 91B outputs a second detection signal on the basis of the current flowing in the terminal Q.

The switching elements 912A and 912B are operated in cooperation with each other and charge the capacitors 911A and 911B, respectively.

More specifically, one terminal of the switching element 912A is connected to one electrode of the capacitor 911A, and the other terminal thereof is connected to the voltage VDD of a high potential power supply source. One terminal of the switching element 912B is connected to one electrode of the capacitor 911B, and the other terminal thereof is connected to the voltage VDD of a high potential power supply source.

The switching elements 912A and 912B are simultaneously turned ON. Then, electric charge is supplied from the voltages VDD of the high potential power supply sources to the capacitors 911A and 911B via the switching elements 912A and 912B, respectively, in the ON state. Thus, the capacitors 911A and 911B are charged.

The capacitors 911A and 911B are discharged on the basis of the currents flowing in the terminals P and Q, respectively.

More specifically, one electrode of the capacitor 911A is connected to the terminal P, and the other electrode thereof is connected to the voltage GND of a reference potential power supply source. The capacitor 911A applies the voltage corresponding to the electric charge stored in the capacitor 911A to the cathode of the first PIN diode 81A via the terminal P. Then, a reverse bias voltage is applied to the first PIN diode 81A. The first PIN diode 81A then outputs a current from the cathode to the anode in accordance with, not only the illuminance of external light, but also the temperature of the PIN diode. On the basis of this output current, the electric charge stored in the capacitor 911A is gradually discharged. Then, the voltage corresponding to the electric charge remaining in the capacitor 911A without being discharged is output from the one electrode of the capacitor 911A. Accordingly, the voltage of the terminal P connected to the one electrode of the capacitor 911A becomes equal to the voltage corresponding to the electric charge remaining in the capacitor 911A without being discharged.

One electrode of the capacitor 911B is connected to the terminal Q, and the other electrode thereof is connected to the voltage GND of a reference potential power supply source. The capacitor 911B applies the voltage corresponding to the electric charge stored in the capacitor 911B to the cathode of the second PIN diode 82A via the terminal Q. Then, a reverse bias voltage is applied to the second PIN diode 82A. The second PIN diode 82A outputs a current from the cathode to the anode in accordance with factors, such as the temperature of the PIN diode, other than the illuminance of external light, and on the basis of this output current, the electric charge stored in the capacitor 911B is gradually discharged. Then, the voltage corresponding to the electric charge remaining in the capacitor 911B without being discharged is output from the one electrode of the capacitor 911B. Accordingly, the voltage of the terminal Q connected to the one electrode of the capacitor 911B becomes equal to the voltage corresponding to the electric charge remaining in the capacitor 911B without being discharged.

The inverters 913A and 913B invert the voltages of the terminals P and Q, respectively, and output the inverted voltages.

More specifically, the input terminal of the inverter 913A is connected to the terminal P, and the output terminal thereof is connected to the terminal R. If the voltage of the terminal P is lower than a predetermined voltage, the inverter 913A outputs the voltage VDD as a first detection signal. In contrast, if the voltage of the terminal P is higher than the predetermined voltage, the inverter 913A outputs the voltage GND.

The input terminal of the inverter 913B is connected to the terminal Q, and the output terminal thereof is connected to the terminal S. If the voltage of the terminal Q is lower than a predetermined voltage, the inverter 913B outputs the voltage VDD as a second detection signal. In contrast, if the voltage of the terminal Q is higher than the predetermined voltage, the inverter 913B outputs the voltage GND.

The exclusive logical OR circuit 95 outputs a light detection signal if one of the voltages of the terminals R and S is the voltage VDD.

More specifically, the terminals R and S are connected to the two input terminals of the exclusive logical OR circuit 95, and a terminal T is connected to the output terminal of the exclusive logical OR circuit 95. If one of the voltages of the terminals R and S is the voltage VDD, the exclusive logical OR circuit 95 outputs the voltage VDD as the light detection signal. If the voltages of both the terminals R and S are the voltage VDD or the voltage GND, the exclusive logical OR circuit 95 outputs the voltage GND.

The counter 92A counts the time for which the voltage of the terminal T remains as the voltage VDD. More specifically, the input terminal of the counter 92A is connected to the terminal T, and the output terminal of the counter 92A is connected to the input terminal of the LUT 93A. The counter 92A starts counting the time when the voltage of the terminal T becomes equal to the voltage VDD, and finishes counting the time when the voltage of the terminal T becomes equal to the voltage GND.

The LUT 93A outputs an illuminance signal indicating the illuminance of external light on the basis of the time counted by the counter 92A. More specifically, the input terminal of the LUT 93A is connected to the output terminal of the counter 92A. The LUT 93A determines the amount of external light on the basis of the time counted by the counter 92A.

For example, as the time counted by the counter 92A is longer, it means that the difference between the degree to which the voltage of the terminal P is reduced and that to which the voltage of the terminal Q is reduced is larger. Accordingly, the difference between the current output from the first PIN diode 81A and the current output from the second PIN diode 82A is larger. This means that the influence of the illuminance of external light is large, and it can be determined that the amount of external light is large.

In contrast, as the time counted by the counter 92A is shorter, it means that the difference between the degree to which the voltage of the terminal P is reduced and that to which the voltage of the terminal Q is reduced is smaller. Accordingly, the difference between the current output from the first PIN diode 81A and the current output from the second PIN diode 82A is smaller. This means that the influence of the illuminance of external light is small, and it can be determined that the amount of external light is small.

Then, the LUT 93A determines the illuminance of external light and outputs an illuminance signal indicating the illuminance of the external light from the output terminal of the LUT 93A.

Figure 7:
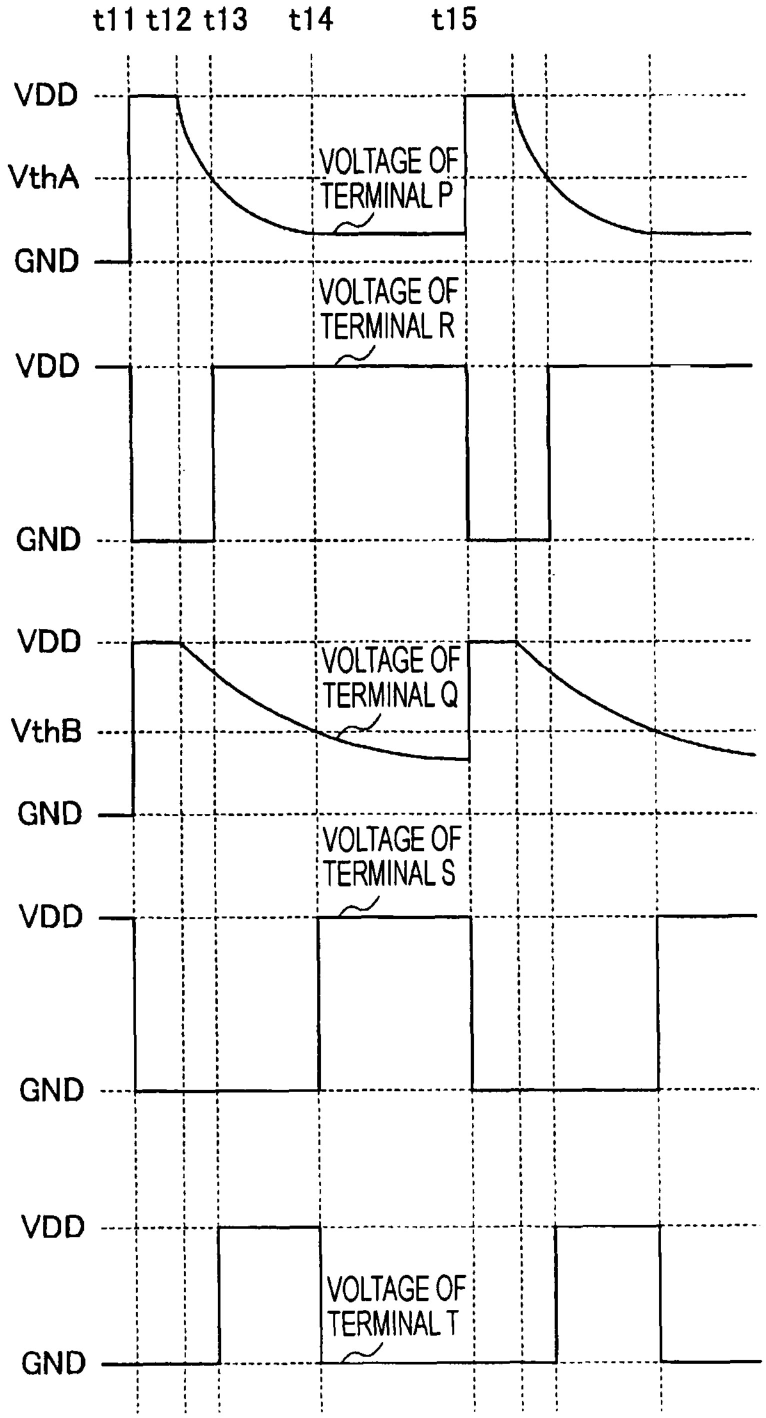
FIG. 7 is a timing chart illustrating the optical sensor.

FIG. 7 is a timing chart of the optical sensor 5A.

In FIG. 7, VthA represents the above-described predetermined voltage used in the inverter 913A. VthB designates the above-described predetermined voltage used in the inverter 913B.

At time t11, both the switching elements 912A and 912B are turned ON. Then, electric charge is supplied from the voltages VDD of the high potential power supply sources to the capacitors 911A and 911B. Then, the voltage of the terminal P connected to the one electrode of the capacitor 911A and the voltage of the terminal Q connected to the one electrode of the capacitor 911B become equal to the voltage VDD.

Accordingly, the voltage of the terminal R connected to the output terminal of the inverter 913A that inverts the voltage of the terminal P and outputs the inverted voltage becomes equal to the voltage GND. The voltage of the terminal S connected to the output terminal of the inverter 913B that inverts the voltage of the terminal Q and outputs the inverted voltage becomes equal to the voltage GND.

As stated above, the exclusive logical OR circuit 95 outputs the voltage VDD if one of the voltages of the terminals R and S is the voltage VDD. Accordingly, in this case, the voltage of the terminal T connected to the output terminal of the exclusive logical OR circuit 95 becomes the voltage GND.

At time t12, both the switching elements 912A and 912B are turned OFF. Then, the electric charge stored in the capacitor 911A is gradually discharged on the basis of the current flowing in the terminal P and reflecting, not only the illuminance of external light, but also the temperature of the PIN diode. Accordingly, the voltage of the terminal P is gradually decreased and reaches the voltage VthA at time t13.

Also, the electric charge stored in the capacitor 911B is gradually discharged on the basis of the current flowing in the terminal Q and reflecting factors, such as the temperature of the PIN diode, other than the illuminance of external light. Accordingly, the voltage of the terminal Q is gradually decreased and reaches the voltage VthB at time t14.

The current reflecting factors, such as the temperature of the PIN diode, other than the influence of the illuminance of external light, is smaller than that reflecting, not only the illuminance of external light, but also the temperature of the PIN diode, by an amount equal to the influence of the illuminance of external light. Thus, the voltage of the terminal Q is decreased more gently than the voltage of the terminal P.

When the voltage of the terminal P reaches the voltage VthA at time t13, the voltage of the terminal R becomes equal to the voltage VDD. Accordingly, the voltage of the terminal T becomes the voltage VDD. Simultaneously, the counter 92A starts counting the time.

When the voltage of the terminal Q reaches the voltage VthB at time t14, the voltage of the terminal S becomes equal to the voltage VDD. Accordingly, the voltage of the terminal T becomes the voltage GND. Simultaneously, the counter 92A finishes counting the time.

Then, the LUT 93 determines the amount of external light on the basis of the period from the time t13 to the time t14 counted by the counter 92A, and outputs the illuminance signal.

Then, at time t15, as in time t11, both the switching elements 912A and 912B are turned ON. Then, the voltage of both the terminals P and Q become equal to the voltage VDD, and the voltage of both the terminals R and S become equal to the voltage GND. Accordingly, the voltage of the terminal T becomes the voltage GND.

According to the second embodiment, the following advantage can be achieved.

(5) The first detection circuit 91A is connected to the first PIN diode 81A, and the second detection circuit 91B is connected to the second PIN diode 82A. Accordingly, the first detection circuit 91A outputs a first detection signal on the basis of the current output from the first PIN diode 81A. The second detection circuit 91B outputs a second detection signal on the basis of the current output from the second PIN diode 82A. When one of the first detection signal and the second detection signal is output, the exclusive logical OR circuit 95 outputs a light detection signal. By counting the time for which the exclusive logical OR circuit 95 outputs the light detection signal, the illuminance of external light can be determined.

Modifications

The invention is not limited to the above-described first and second embodiments, and modifications and improvements can be made within the spirit of the invention.

For example, although in the first embodiment the common electrodes 56 are formed on the counter substrate 70, they may be disposed on the element substrate 60.

In the first embodiment, the amount of light emitted from the backlight 41 is controlled in accordance with the illuminance of external light. Alternatively, instead of the light emitted from the backlight 41, an image signal may be adjusted.

In the first embodiment, opaque beads mixed into the sealing material are formed of a spherical resin containing a pigment. Alternatively, a spherical resin whose surface is colored with a pigment may be used.

In the first and second embodiments, the liquid crystal panel includes the 320 scanning lines Y and the 240 data lines X. However, the numbers of scanning lines Y and data lines X are not restricted. For example, 480 scanning lines Y and 640 data lines X may be provided.

In the first and second embodiments, the invention is applied to the electro-optical device 1 using a liquid crystal as an electro-optical material. However, the invention is not restricted to this type of electro-optical device, and an organic EL display using an organic LED may be used, in which case, a sealing member around the display area is used as the peripheral member.

Applied Examples

Electronic apparatuses using the electro-optical device 1 according to the first or second embodiment are described below.

Figure 8:
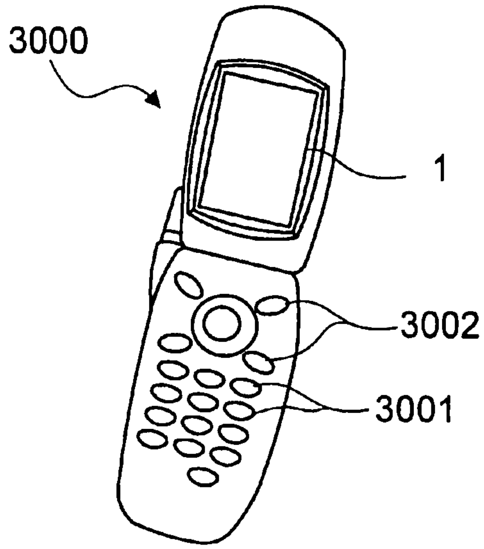
FIG. 8 is a perspective view illustrating the configuration of a cellular telephone to which the electro-optical device is applied.

FIG. 8 is a perspective view illustrating the configuration of a cellular telephone 3000 to which the electro-optical device 1 is applied. The cellular telephone 3000 includes a plurality of operation buttons 3001, a plurality of scroll buttons 3002, and the electro-optical device 1. Operating the scroll buttons 302 scrolls the screen displayed on the electro-optical device 1.

Electronic apparatuses to which the electro-optical device 1 is applied include, not only the cellular telephone 3000 shown in FIG. 8, but also personal computers, information portable terminals, digital still cameras, liquid crystal televisions, viewfinder-type or monitor direct-view-type video cassette recorders, car navigation systems, pagers, digital diaries, word-processors, workstations, videophones, point-of-sales (POS) terminals, touch panels, etc. As the display units of various types of electronic apparatuses, the above-described liquid crystal devices can be used.

The entire disclosure of Japanese Patent Application Nos 2006-183052, filed Jul. 3, 2006 and 2007-62950, filed Mar. 13, 2007 are expressly incorporated by reference herein.

What is claimed is:

1. An electro-optical device including an electro-optical panel, a display area of the electro-optical panel being surrounded by a peripheral sealing member, comprising:

a first light-receiving sensor that receives external light; and a second light-receiving sensor that is connected to the first light-receiving sensor and that is shielded from the external light received by the first light-receiving sensor; and a light detection circuit configured to determine an illuminance of the external light based on a difference in a first electrical signal output from the first light-receiving sensor and a second electrical signal output from the second light-receiving sensor, wherein the second light-receiving sensor is located at a position at which the second light-receiving sensor is covered by the peripheral sealing member to block or shield external light from the second light-receiving sensor, and wherein the second light-receiving sensor is at least partially embedded within the peripheral sealing member.

2. The electro-optical device according to claim 1, further comprising:

an illumination unit that emits light to the electro-optical panel, wherein a first light-shielding film is disposed between the illumination unit and the first light-receiving sensor and between the illumination unit and the second light-receiving sensor.

3. The electro-optical device according to claim 1, wherein the electro-optical panel is a liquid crystal panel including a pair of substrates between which a liquid crystal is disposed, and the peripheral sealing member seals the liquid crystal.

4. The electro-optical device according to claim 3, wherein the peripheral sealing member includes an adhesive material that bonds the pair of substrates to each other and a material having a transmittance ratio lower than the adhesive material.

5. The electro-optical device according to claim 1, wherein the light detection circuit is connected to the first light-receiving sensor and the second light-receiving sensor so that the light detection circuit outputs a light detection signal on the basis of the first electric signal output from the first light-receiving sensor and the second electric signal output from the second light-receiving sensor.

6. The electro-optical device according to claim 1, wherein a second light-shielding film that shields the second light-receiving sensor from the external light is provided, and the first light-receiving sensor is located at a position at which the first light-receiving sensor is exposed through the second light-shielding film.

7. The electro-optical device according to claim 6, wherein the second light-shielding film is located at a position at which the second light-shielding film is overlapped with the peripheral member and is formed to be larger than the peripheral member.

8. The electro-optical device according to claim 6, wherein the second light-shielding film is disposed such that it surrounds the display area.

9. An electronic apparatus comprising the electro-optical device set claim 1.

10. The electro-optical device according to claim 3, wherein the first light-receiving sensor and the second light-receiving sensor are formed on only one of the substrates.

11. The electro-optical device according to claim 3, wherein a first one of the substrates has the first light-receiving sensor, the second light-receiving sensor, and a plurality of pixel electrodes formed thereon, and a second one of the substrates is a counter substrate having a plurality of color filters formed thereon.

* * * * *